Figure 1:
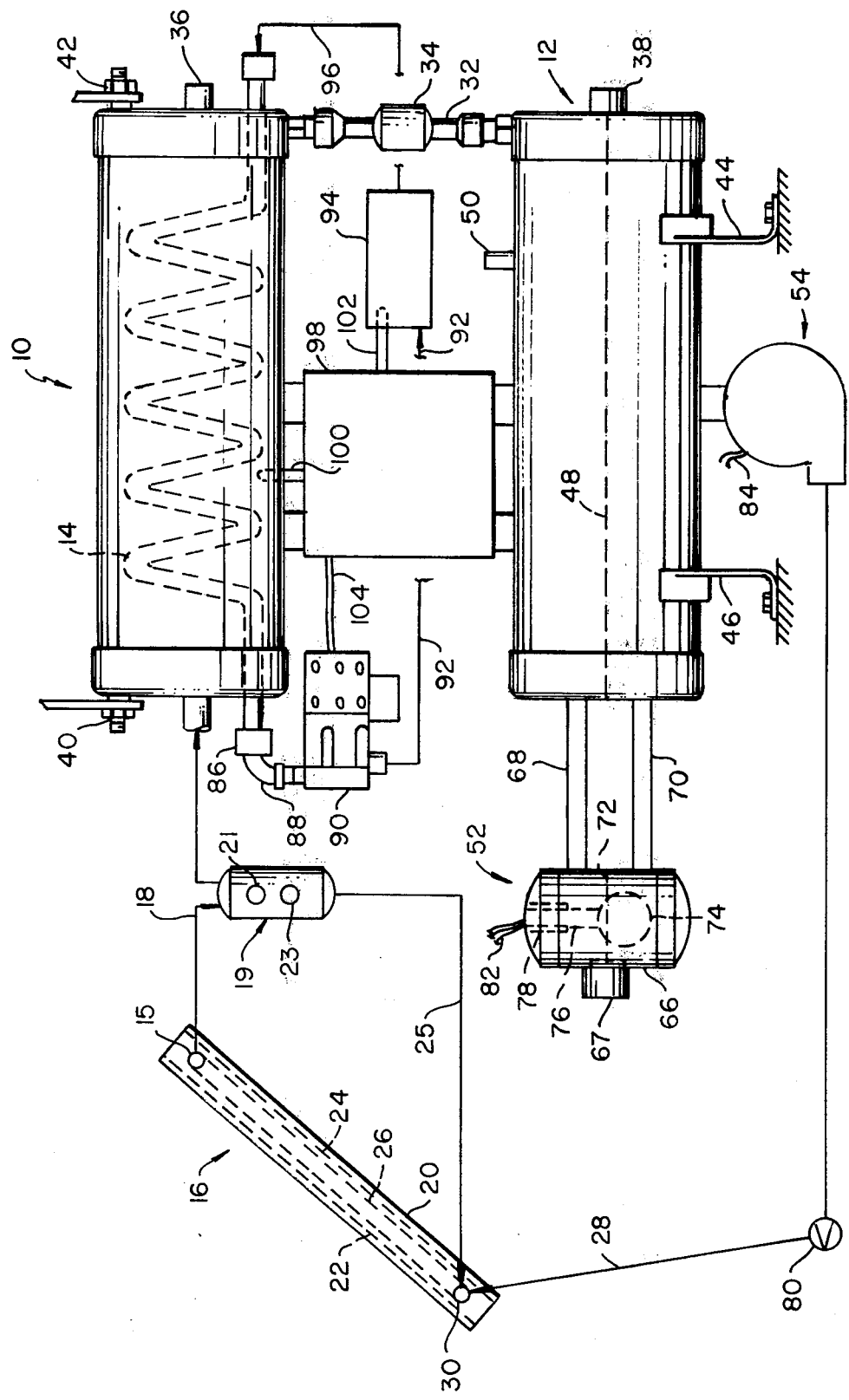

United States Patent [19]

Bottum

[11] 4,220,138
[45] Sep. 2, 1980

[54] REFRIGERANT CHARGED SOLAR HEATING STRUCTURE AND SYSTEM

[76] Inventor: Edward W. Bottum, 9357 Spencer Rd., Brighton, Mich. 48116

[21] Appl. No.: 871,779

[22] Filed: Jan. 24, 1978

[51] Int. Cl.² ............................................... F24J 3/02
[52] U.S. Cl. .......................................... 126/433; 62/2; 126/423; 165/105
[58] Field of Search ............... 126/270, 271, 433, 434, 126/437, 450, 423; 237/1 A; 62/2, 503; 165/105

[56] References Cited

U.S. PATENT DOCUMENTS

| 2,692,483 | 10/1954 | Hedlund ..................................... 62/2 |
| 3,390,672 | 7/1968 | Snelling ................................ 126/271 |
| 3,919,859 | 11/1975 | Ross ........................................ 62/503 |
| 3,991,936 | 11/1976 | Switzgable .......................... 237/1 A |
| 4,061,131 | 12/1977 | Bohanon .............................. 237/1 A |
| 4,120,289 | 10/1978 | Bottum ................................. 126/271 |

Primary Examiner—James C. Yeung
Attorney, Agent, or Firm—Whittemore, Hulbert & Belknap

[57] ABSTRACT

A solar heating system is provided. The heating system comprises a solar collector structure operatively connected to a heat dissipating structure including means for ultimately using the heat energy which the system produces. Refrigerant is used in the system. The refrigerant is boiled in the collector and condensed in the heat dissipating structure to give off heat. A vessel is located below the heat dissipating structure. Liquid refrigerant flows into the vessel and is pumped back to the collector in selected quantities.

8 Claims, 2 Drawing Figures

REFRIGERANT CHARGED SOLAR HEATING STRUCTURE AND SYSTEM

BACKGROUND OF THE INVENTION

Solar heating systems in the past have been completely filled with a collector fluid, except for a small expansion volume in the surge tank.

The present solar heating system departs from past practice in that a refrigerant, such as the fluorinated hydrocarbons, is used as the collector fluid. The collector is filled with liquid refrigerant, Gaseous refrigerant moves from the collector to heat dissipating structure where it is condensed to give up heat. The liquid refrigerant flows to a vessel and is pumped back to the collector in selected quantities. Normally, there are no pressure reducing valves or regulating valves used in the system. The entire system being basically under the same pressure, such control devices may be dispensed with. However, this is not to exclude the use of such structures under certain conditions. The pressure will be determined by the condensing temperature in the heat dissipator.

In past practice the sensible heat of the collector fluid is raised in the collector as heat is picked up. The collector fluid is then circulated by a pump (using some energy) to a heat exchanger or heat dissipating or storing device.

In this invention latent heat of the refrigerant is picked up causing the liquid refrigerant to "boil" and change to vapor according to the amount of heat picked up. Vapor pressure immediately travels to the heat dissipating device where it condenses and returns as a liquid to the vessel, this being a continuous procedure as long as heat is being absorbed by the collector.

Now, since latent heat is being used for heat movement instead of sensible heat, if the load at the heat dissipator is equal to the heat input at the collector, the pressure in the system will remain constant and not increase. Therefore, the collector plate temperature can remain lower than in old style systems where sensible heat is picked up. Since the ΔT in the collector is greater, the efficiency of a collector can be much greater than for old style collector fluid charged systems.

Also, the response to sudden bursts of sunlight is almost instantaneous in a refrigerant charged system and it will be picking up and transferring usable heat before the old style collector fluid charged system can get started.

A refrigerant charged system is very useful in picking up an abundance of "low grade" heat for use with heat pumps. Heat may be transferred from the ground or storage tanks or phase change materials for use in heat pumps with the expenditure of very little or no energy.

Obviously, this system ma be used for picking up heat and moving it inside to a radiator, or fan coil, or heat dissipating plate, or water heater, or heat exchanger primary, or for storage in water, masonry, phase change materials, etc.

A refrigerant charged system has many advantages: Refrigerants do not freeze and all concern as to freezing of the collector are forever eliminated. Certain refrigerants do not contaminate or corrode or form varnish in collector plates. Most common refrigerants are completely non-toxic. A refrigerant charged collector responds faster on cloudy days. It is more efficient since latent heat is used instead of sensible heat and the plate temperature remains lower resulting in greater heat pick-up by the collector plate. Refrigerants are readily available everywhere and competitively priced. Fewer pounds of refrigerant are required since only the collectors are "flooded." Cost is usually less, leaks may be more easily found by means of a leak detector.

SUMMARY OF THE INVENTION

A closed solar heating system is provided. The system includes a solar collector structure, heat dissipating structure, a vessel and means for circulating a refrigerant heat transfer medium in gaseous form from the collector structure to the heat dissipating structure and in liquid form from the heat dissipating structure to the vessel. Pump means are provided for pumping liquid refrigerant from the vessel to the collector structure. All of these elements are connected together in operative relationship. A refrigerant heat transfer medium is provided in the system. The solar collector is located to receive sun rays. The heat dissipating structure in effective to transfer heat to a heat receiving medium. Control means are provided for the pump means to activate the pump means when liquid refrigerant in the vessel rises above a predetermined level and to de-activate the pump means when the liquid refrigerant in the vessel falls below a predetermined level.

IN THE DRAWINGS

Figure 2:
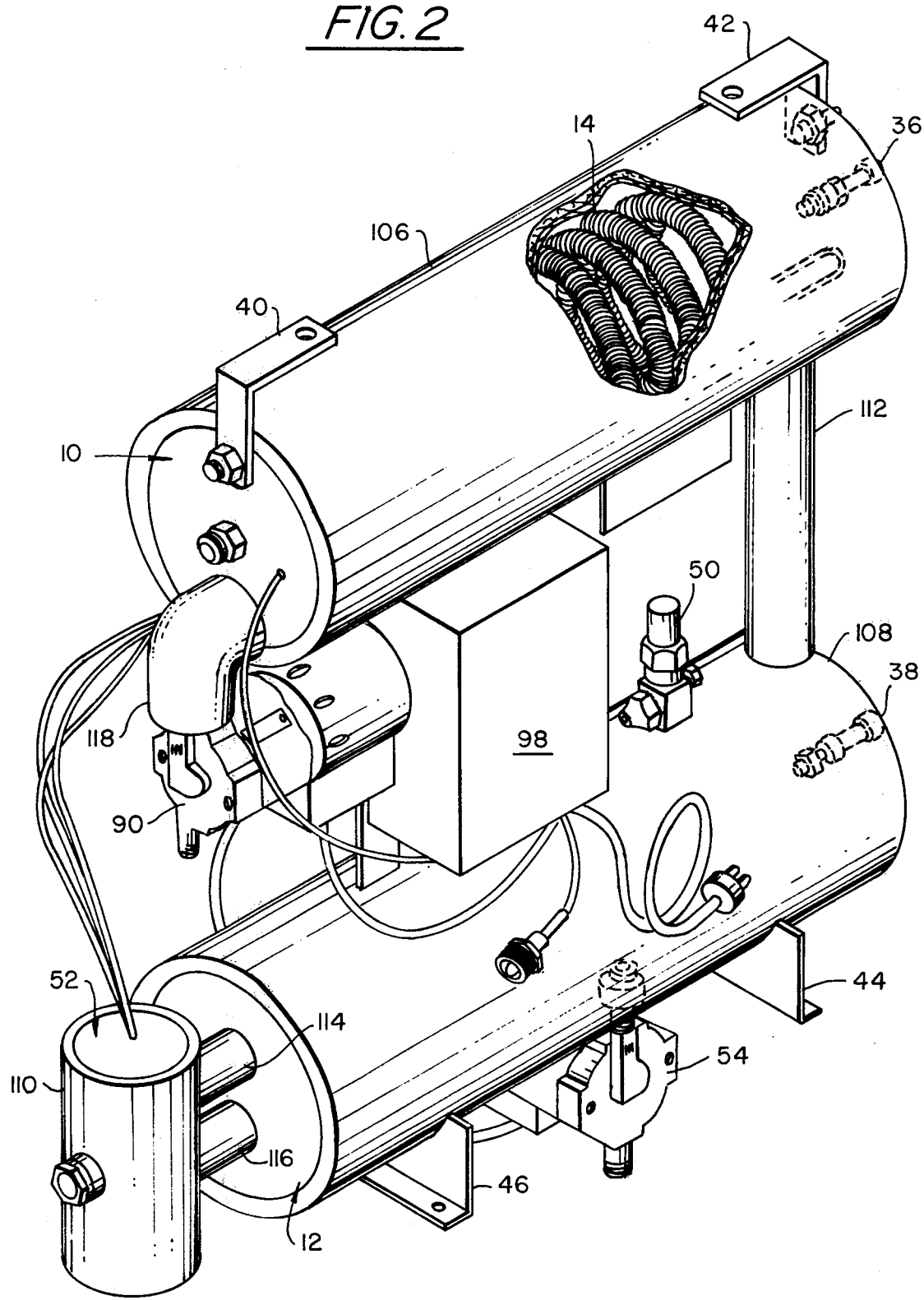

FIG. 1 is a diagrammatic view of a refrigerant charged solar heating structure and system in accordance with one embodiment of the present invention; and FIG. 2 is an isometric view of an actual embodiment of the FIG. 1 structure.

Referring to the drawings, the system includes a pair of vessels 10, 12 for liquid refrigerant. The upper vessel 10 serves as a structure for condensing vaporized refrigerant into a liquid. In this process, heat is given up by the refrigerant. A finned tube coil 14 is provided within vessel 10. Water is run through coil 14. The water is heated by the latent heat given up by the condensing refrigerant.

Vaporized refrigerant is supplied to vessel 10 from the outlet 15 of solar collector 16 via conduit 18.

In the past, the heat transfer mediums in use for solar heating systems have been such as brine water, ethylene glycol, silicone-type liquid fluids and the like. Certain problems, such as freezing at extremely low temperatures and corrosion of parts, have been encountered with these mediums. Also, certain inefficiencies resulting from the fact that these mediums absorb and give out sensible heat are inherent. Absorption of heat results in raising the temperature and extraction of heat results in lowering the temperature of such mediums. This means that relatively large amounts must be circulated and that the temperature of the collector surface must be fairly high in order that large amounts of heat may be transferred.

In the present invention, standard refrigerant fluid suitable for use in refrigeration, normally fluorinated hydrocarbons, is used as the heat exchange medium. The refrigerant changes from a liquid to a gas in the collector 12; in essence, it boils. Thus, it is the latent heat causing evaporation, not sensible heat, which is absorbed by the refrigerant in the collector 16. As there is no great change in temperature upon evaporation, the collector will run cooler than conventional systems.

Also, less amounts of fluid need be pumped, when pumping is necessary, thereby reducing pump size and energy use thereof, because more heat is absorbed in smaller volume of medium.

When the evaporated refrigerant circulates through vessel 10, it condenses into a liquid. In so doing, it gives off the latent heat as desired.

The collector 16 is of the type wherein the lower portion may be flooded with liquid refrigerant while the upper portion receives the gaseous refrigerant. Referring to FIG. 1, the collector comprises a casing 20 having a transparent plate 22 through which the sun's rays pass. Inside the casing 20 is a metal plate 24, normally blackened to result in maximum absorption of sun rays.

A tubular structure 26 is secured on the face of plate 24 in heat transfer relation thereto. The structure 26 preferrably comprises a plurality of parallel tubes connected at each end by tubular manifolds. Conduit 28 is connected to inlet 30 and conduit 18 is connected to outlet 15.

As will be appreciated, when collector 16 is positioned as in FIG. 1, liquid refrigerant may flood the lower portions of tubes 26 while gaseous refrigerant may boil into the upper portions. In most positions of collector 16, this result would occur. A thin, flat vessel could be used instead of tubular structure 26. On the other hand, a sinuous tubular structure would be undesirable because the gaseous refrigerant would have to move through liquid refrigerant.

As will be appreciated, several collectors 16 may be connected together in a bank.

Liquid refrigerant condensate flows by gravity from vessel 10 to vessel 12 via conduit 32. A thermostatic valve 34 is of the type which will automatically close when the temperature of liquid refrigerant passing therethrough reaches a predetermined point. The valve 34 thereby serves a safety function preventing overheating of the system. When valve 34 closes, liquid refrigerant will no longer flow into vessel 12 and the entire system will then shortly shut down. In addition to valve 34, each vessel is provided with a pressure relief valve 36, 38.

Each of the vessels is provided with mounting structure 40, 42, 44, 46 to permit mounting of the vessels in support structure.

A reference level 48 of liquid refrigerant is maintained in vessel 12. The entire system is charged with refrigerant via charging and service valve 50 in vessel 12. With the reference level 48 maintained and the correct amount of charge, approximately the optimum amount of refrigerant will be present in collector 16 and vessel 10 to result in efficient operation of the system. This is very desirable because it eliminates the need for control devices in collector 16 and vessel 10. This is particularly desirable in connection with collector 16 because it is located at a position remote from vessels 10, 12 which are normally located in a building. The installation and maintainance costs incident to providing controls on collector 16 are thus eliminated.

The reference level 48 is maintained in vessel 12 by means of a float control structure 52 and pump 54.

The float control structure 52 comprises a vessel 66 which is connected to vessel 12 by means of upper and lower conduits 68, 70. The lower conduit 70 is located at a point below reference level 48. Thus liquid refrigerant will flow from vessel 12 into vessel 66 and maintain a liquid level 72 in vessel 66 which is the same as level 48. This level may be observed by means of sight glass 67. The upper conduit 68 equalizes the pressure in the two vessels.

A float 74 is provided in vessel 66. An actuating element 76 extends from float 72 into an electrical switch housing 78 in which is provided an electrical switch. The switch is connected via leads 82 to electrical power (not shown) and to the electrical motor or pump 54 via leads 84. When the reference level 48 in vessel 12 and thus level 72 in vessel 66 rises to a predetermined point, the float actuator causes closing of the switch to activate the pump 54. Pump 54 will then pump liquid refrigerant via conduit 28 into collector 16. Such pumping will continue until reference level 48 falls to the desired point. A check valve 80 is provided in conduit 28 to prevent flow of refrigerant back from the collector.

The pump is preferably located directly below vessel 12 as shown. Thus, should there be any vaporization of refrigerant in the pump, the gas thus formed will rise into the vessel making it impossible for the pump to become vapor locked.

Referring now the the water circulation system, it will be noted that the outlet 86 is connected by conduit 88 to water pump 90. The water pump 90 is connected by conduit 92 to the inlet of water storage tank 94. Cold water is forced out of tank 94 via conduit 96 to the inlet of coil 14.

A differential thermostat 98 is mounted between vessels 10, 12. The thermostat 98 has one heat sensor 100 which measures the temperature of the refrigerant gas in vessel 10. A second heat sensor 102 measures the temperature of water in tank 94. When the differences in these temperatures is adequate to result in efficient heat transfer between the refrigerant and water, the thermostat 98 (which is operably connected to pump 90 via leads 104) causes the pump to circulate water. For example, water may be circulated when the temperature of refrigerant is five degrees above water in tank 94.

As will be noted in FIG. 2, the vessels 10, 12, 66 and conduits 32, 68, 70, 88 are wrapped in heat insulation material 106, 108, 110, 112, 114, 116. This insulation considerably improves the efficiency of the system.

In operation of the system, liquid refrigerant is boiled in the collector 16 when the sun rays shine thereon. The gaseous refrigerant passes to the vessel 10 as a consequence of its own pressure. It is not pumped by external means. As shown in FIG. 1, an accumulator 19 is preferably provided in conduit 18. The accumulator 19 is a closed vessel. A pair of sight glasses 21, 23 are provided to permit visual sighting of the liquid content of the vessel. An inlet and outlet are provided in the upper portion of the vessel for connection to the conduit 18. An outlet for liquid is provided in the lower portion of the vessel and a conduit 25 extends therefrom to the inlet 30 of collector 16. Gaseous refrigerant having liquid entrained therein will enter the accumulator from collector 16. The liquid will fall to the bottom and flow by gravity back to the collector 16 via conduit 25. The dry gas will then flow on to the vessel 10 via conduit 18. In this fashion, capacity and thus efficiency of the system is improved. The gaseous refrigerant condenses in vessel 10, thus giving off heat. The liquid refrigerant then returns to vessel 12 by means of gravity, it being remembered that vessel 10 is located above vessel 12.

Liquid refrigerant is then pumped back to collector 16 when reference level 48 rises above the predetermined point. In the event the system overheats, valve 34 will close thus causing the system to shut down. Water is circulated through coil 14 and is heated as it passes through vessel 10 at times when efficient heat exchange is possible.

While the system has been described as a heating means for a water tank, it will be appreciated that other uses for the heat can be made. For example, the gaseous refrigerant from the collector can be passed through a coil located in a swimming pool or in concrete.

Having thus described my invention, I claim:

1. A closed solar heating system comprising a solar collector structure, heat dissipating structure, a vessel and means for circulating a refrigerant heat transfer medium in gaseous form from the collector structure to the heat dissipating structure and in liquid form from the heat dissipating structure to the vessel and pump means for pumping liquid refrigerant from the vessel to the collector structure, all connected together in operative relationship, and a refrigerant heat transfer medium in said system, said solar collector being located to receive sun rays, said heat dissipating structure being effective to transfer heat to a heat receiving medium, control means for said pump means to activate the pump when liquid refrigerant in said vessel rises above a predetermined level and to de-activate said pump means when the liquid refrigerant in the vessel falls below a predetermined level and an accumulator vessel in said means for circulating a refrigerant heat transfer medium in gaseous form from the collector structure to the heat dissipating structure to remove any liquid entrained in the gaseous refrigerant heat transfer medium, and means for flowing said liquid back to the collector structure from said accumulator vessel.

2. A closed solar heating system as in claim 1, further characterized in that the solar collector structure includes refrigerant flow structure adapted for the flow of fluid refrigerant therethrough, said last mentioned structure having a lower portion adapted to be flooded with liquid refrigerant and an upper portion contiguous therewith to receive gaseous refrigerant as the liquid refrigerant below vaporizes.

3. A closed solar heating system as in claim 1, further characterized in that the refrigerant heat transfer medium is a fluorinated hydrocarbon.

4. A closed heating system as in claim 1, further characterized in that said pump means is located directly below said vessel.

5. A closed solar heating system as in claim 1, further characterized in that said heat dissipating structure comprises a second vessel into which gaseous refrigerant flows and condenses, and means for circulating water through said second vessel to be heated by the heat given up upon condensation of the refrigerant.

6. A closed solar heating system as in claim 1, further characterized in that said control means is a float control structure.

7. A closed solar heating system as in claim 1, further characterized in that the vessel is located below the heat dissipating structure, said liquid refrigerant flowing to the vessel by gravity.

8. The method of solar heating comprising providing liquid refrigerant heat transfer medium in a solar collector structure, subjecting the collector structure to the sun's rays to cause boiling of said medium to form gaseous medium, removing any liquid entrained in the gaseous medium, flowing the removed liquid back to the collector structure, passing said gaseous medium with the liquid removed therefrom to a heat dissipating structure as a consequence of its own pressure, condensing said gaseous medium to a liquid medium in the heat dissipating structure to give off heat, and flowing said liquid medium to a vessel, returning said liquid medium from the vessel to said collector structure when the level thereof in the vessel rises above a predetermined level and discontinuing returning said liquid medium from the vessel to said collector structure when the level thereof in the vessel falls below a predetermined level.

* * * * *